(12) United States Patent
Krysinski et al.

(10) Patent No.: US 6,680,554 B2
(45) Date of Patent: Jan. 20, 2004

(54) AIRCRAFT, PARTICULARLY A HELICOPTER, TRANSMISSION SYSTEM

(75) Inventors: Thomasz Krysinski, Marseilles (FR); Bérengère Vignal, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 5 days.

(21) Appl. No.: 09/988,263

(22) Filed: Nov. 19, 2001

(65) Prior Publication Data

US 2002/0065139 A1 May 30, 2002

(30) Foreign Application Priority Data

Nov. 30, 2000 (FR) .............................. 00 15513

(51) Int. Cl.⁷ .............................................. H02K 7/09
(52) U.S. Cl. ...................................... 310/90.5; 464/180
(58) Field of Search ........................ 464/180; 310/90.5; 188/267; 244/60

(56) References Cited

U.S. PATENT DOCUMENTS

| | | |
|---|---|---|
| 3,963,372 A | 6/1976 | McLain et al. |
| 4,128,795 A | 12/1978 | Habermann et al. |
| 4,236,426 A * | 12/1980 | Meinke et al. .......... 464/180 X |
| 4,406,642 A * | 9/1983 | McNall ...................... 464/180 |
| 4,686,404 A | 8/1987 | Nakazeki et al. |
| 5,271,295 A | 12/1993 | Marnot |
| 5,347,190 A * | 9/1994 | Lewis et al. ................ 310/90.5 |
| 6,138,629 A | 10/2000 | Masberg et al. |

FOREIGN PATENT DOCUMENTS

WO 9805882 2/1998

OTHER PUBLICATIONS

FR 0015513 Search Report dated Aug. 9, 2001.

\* cited by examiner

*Primary Examiner*—Greg Binda
(74) *Attorney, Agent, or Firm*—Stevens, Davis, Miller & Mosher, LLP.

(57) ABSTRACT

Transmission system for an aircraft, particularly a helicopter.

The transmission system (1), of supercritical type, comprises at least one rotary transmission tube (4) which is such that at least one natural frequency of said transmission tube (4) is below its nominal rotational speed, and at least one active and controllable magnetic damper (5) capable of generating a magnetic force capable of acting on said transmission tube (4) and which damper is controlled in such a way as to generate a magnetic force making it possible to reduce the vibration of the transmission tube (4), at least when the speed of the transmission tube (4) is within a predetermined range of frequencies defined around said natural frequency.

9 Claims, 2 Drawing Sheets

AIRCRAFT, PARTICULARLY A HELICOPTER, TRANSMISSION SYSTEM

BACKGROUND OF THE INVENTION

The present invention relates to a transmission system for an aircraft, particularly a helicopter.

More specifically, although not exclusively, this transmission system is intended to transmit power (on a helicopter) between the main gearbox (associated with the main forward travel and lift rotor) and the rear gearbox (associated with the antitorque tail rotor) of the helicopter.

It is known that in order to achieve such transmission of power, a transmission system of a conventional type comprises a great many components such as tubes, connecting elements (flanges, flectors, etc.) and guide bearings. As a result, this conventional transmission system is particularly heavy, bulky, expensive and complex.

In addition, this high number of components means that a significant amount of lubrication needs to be provided, this of course giving rise to drawbacks (cost, risk of leakage, etc.). A known transmission system of this kind also entails having a number of bearings for the tubes, which bearings themselves also exhibit numerous drawbacks, such as the fact that they introduce stiffness, for example.

DESCRIPTION OF THE PRIOR ART

In order to at least partially overcome some of these drawbacks, a new type of transmission system known as a supercritical transmission system has been developed. A system such as this has far fewer mechanical parts and the transmission tubes have a greater diameter and are generally longer, which in particular makes it possible to reduce the number of bearings. In consequence, such a supercritical transmission system is lighter in weight, simpler to produce and less expensive.

However, this supercritical transmission system also differs from said conventional transmission system in that it has one or more natural frequencies (particularly the natural frequencies of bending of the transmission shaft) which are below the nominal rotational speed of the shaft (hence the name "supercritical transmission system"), whereas for the aforementioned conventional transmission system (known as "subcritical"), all the natural frequencies are above the nominal rotational speed.

In the context of the present invention, the nominal speed is to be understood as meaning the theoretical mean operating speed which is kept more or less constant for the flight of the aircraft.

In consequence, with such a supercritical transmission system, as the speed is increased, when the rotational speeds nears one of said natural frequencies, the vibration generated by this natural frequency is amplified and this may become particularly troublesome, particularly for the pilots and passengers of the aircraft and even, under certain circumstances, may become dangerous and in addition leads to accentuated wear of the parts of the transmission and other components of the aircraft.

SUMMARY OF THE INVENTION

The present invention relates to a transmission system for an aircraft, particularly a helicopter, that makes it possible to overcome these drawbacks.

To this end, according to the invention, said transmission system for an aircraft, of the supercritical type, comprising at least one rotary transmission tube which is such that at least one natural frequency of said transmission tube is below its nominal rotational speed, is notable in that it additionally comprises at least one active and controllable magnetic damper:

capable of generating a magnetic force capable of acting on said transmission tube; and controlled in such a way as to generate a magnetic force that makes it possible to reduce the vibration of said transmission tube, at least when the speed of said transmission tube is within a predetermined range of frequencies defined about said natural frequency.

Thus, by virtue of the invention, as the speed increases (or decreases), when the rotational speed of the transmission tube nears said natural frequency, that is to say when it falls within the aforementioned range of frequencies, the magnetic damper according to the invention damps the vibration. In consequence, the usual amplification of the vibration as the natural frequency is passed through cannot take place, which prevents the occurrence of the aforementioned problems.

It will be noted that the damper according to the invention additionally makes it possible to replace one or more of the customary bearings of the transmission tube.

The transmission system according to the invention has numerous other advantages associated:

on the one hand, with the use of a magnetic damper rather than a customary bearing (for example a ball bearing); and on the other hand, with the use of a supercritical system rather than a subcritical system.

Indeed, as indicated before, a supercritical transmission system is simpler, more lightweight, less bulky and less expensive than a conventional subcritical transmission system.

Furthermore, the use of at least one magnetic damper in particular affords the following advantages:

very low power consumption (approximately ten times less than for an equivalent ball bearing), a reduction in losses and an improvement in efficiency;

the absence of mechanical contact between the elements (hence an absence of wear), a longer life and greater reliability;

the possibility of obtaining very high transmission tube rotational speeds;

the possibility of operating under very arduous conditions, particularly at temperatures from −160° C. to +250° C. and in a very aggressive environment;

a regulating system (control loop) which is simple, as specified below;

the elimination of the oil and of the lubricating system;

the absence of contamination due to oil or grease; and the possibility of dispensing with the conventional covers intended for transmission system maintenance.

Advantageously, said magnetic damper comprises:

a stator which comprises at least one electromagnet;

a rotor which is mounted on said transmission tube and which is situated in a zone of action of a magnetic force capable of being generated by said at least one electromagnet;

an electric current generator for producing an electric current capable of flowing through said electromagnet; and means for controlling said electric current flowing through said electromagnet so as to control said magnetic force which acts on the rotor and therefore on the transmission tube.

As a preference, said magnetic damper comprises a number of electromagnets mounted in opposed pairs across said transmission tube.

In a preferred embodiment, said magnetic damper additionally comprises:

- at least one sensor for measuring the lateral displacement of the transmission tube; and
- a control loop which controls the generation of the magnetic force acting on the transmission tube as a function of the measurements taken by said sensor.

Thus, the magnetic damper is controlled automatically, simply and effectively, using this control loop. This avoids the intervention of an operator, particularly of the pilot.

However, such human intervention for controlling the operation of the magnetic damper may also be envisioned in the context of the present invention.

Moreover, advantageously, said magnetic damper is formed in such a way as to generate a magnetic force that makes it possible to shift at least said natural frequency of the transmission tube. As a preference, this shift is limited to roughly 3% of the initial value (prior to the shifting) of the natural frequency. To do this, the magnetic damper is designed in such a way that the residual stiffness it affords is below a predetermined value.

Furthermore, advantageously, the transmission system according to the invention additionally comprises:

- at least one sensor for measuring the lateral displacement of the transmission tube; and
- diagnostic means which, from the measurements taken by this sensor, deduce any malfunctioning there might be of the transmission system, and, in particular, of the magnetic damper.

Although not exclusively, the present invention applies more particularly to a helicopter equipped, in the customary way, with a main gearbox and with a rear gearbox.

In this case, advantageously, said at least one transmission tube of the transmission system is arranged in such a way as to connect said main and rear gearboxes.

As a preference, said transmission system comprises, in this case, a single transmission tube between the two gearboxes.

Thus it is conceivable for the customary bearings to be completely omitted.

Furthermore, advantageously, said magnetic damper is arranged between said main and rear gearboxes at a distance from said main gearbox which is roughly equal to one tenth of the total length of said transmission tube.

BRIEF DESCRIPTION OF THE DRAWINGS

The figures of the appended drawing will make it easy to understand how the invention may be achieved. In these figures, identical references denote elements which are similar.

DESCRIPTION OF THE PREFERRED EMBODIMENTS

Figure 1:
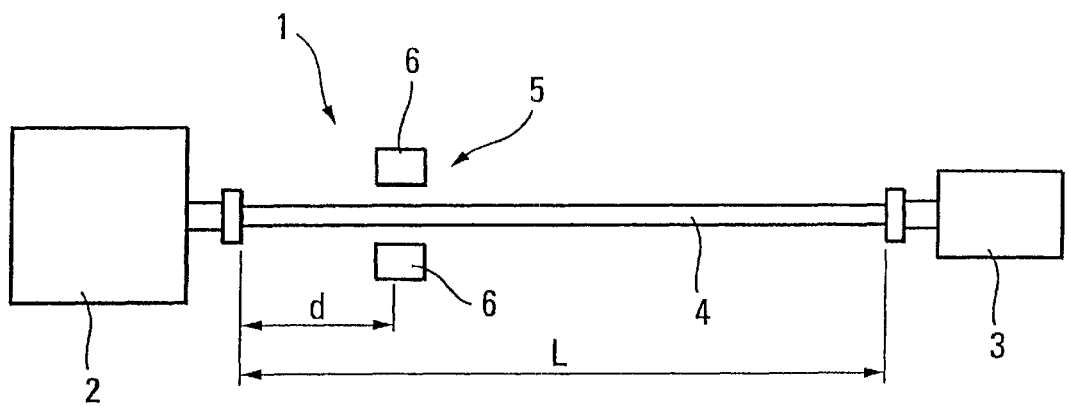
FIG. 1 schematically shows a transmission system according to the invention, mounted between two gearboxes.

The transmission system 1 according to the invention and depicted (partially and schematically) in FIG. 1, is intended to transmit power between two gearboxes 2 and 3 of an aircraft, not depicted. More specifically, although not exclusively, the gearbox 2 may be the main gearbox of a helicopter, which is connected to the main forward travel and lift rotor of said helicopter, and the gearbox 3 may be the rear gearbox of the helicopter, which is associated with the antitorque tail rotor.

According to the invention, this transmission system 1 which comprises at least one transmission tube (or shaft) 4 is of the known, supercritical, type. In consequence, this transmission system 1 has far fewer parts [tubes, connecting elements (flanges, flectors, etc.), guide bearings, etc.] than a conventional transmission system.

This transmission system 1 is therefore, in particular, lighter in weight, less bulky and less expensive (especially if it has just one transmission tube 4).

Figure 2:
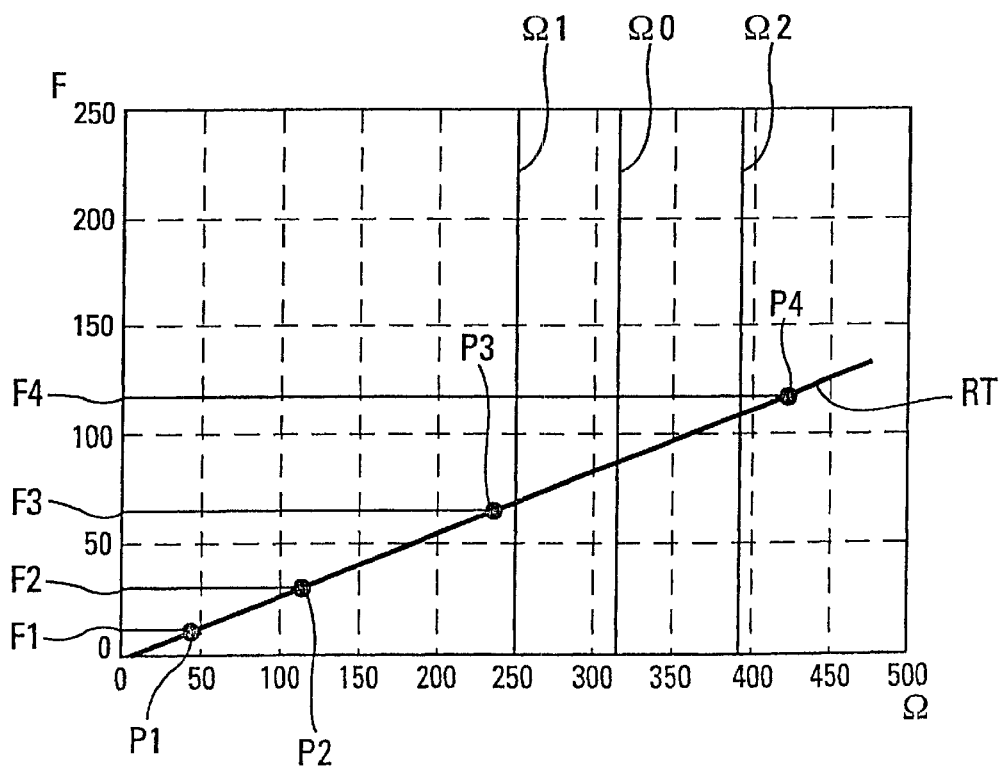
FIG. 2 is a graph showing the critical points as the speed of the transmission tube increases, for which the intervention of a magnetic damper according to the invention is needed.

However, such a supercritical transmission system 1 has several natural frequencies F1, F2 and F3 which are below the nominal speed RT of the transmission tube 4, as depicted in FIG. 2.

In this particular instance these are natural frequencies of bending of said transmission tube 4.

However, the present invention may take other types of natural frequency into consideration.

FIG. 2 shows a graph which, along the X-axis, shows the speed $\Omega$ (expressed in revolutions per minute) of the helicopter main rotor, associated with the main gearbox 2 and, along the Y-axis, shows the frequency F (expressed in hertz) containing said natural frequencies F1 to F3.

This FIG. 2 also depicts:

- as $\Omega 0$, the nominal speed of the helicopter main rotor;
- as $\Omega 1$, the speed of the main rotor when the helicopter is on the ground; and
- as $\Omega 2$, the speed of the rotor when the helicopter is in autorotation.

In consequence, when the transmission tube 4 runs up to speed (with a speed increase which corresponds to an increase in main rotor speed $\Omega$ from 0 to 350 rpm, for example), the speed RT crosses through the natural frequencies F1 to F3 as illustrated by the points P1 to P3 in FIG. 2.

At these points P1 to P3, the vibration generated by these natural frequencies F1 to F3 is amplified. Such vibration may be troublesome to the pilots and passengers of the helicopter. In addition, it increases the wear on the parts of the transmission system 1 and of the helicopter.

It will be noted that another natural frequency F4, also depicted in FIG. 2 does not, for its part, pose any problem of the crossing of frequencies because it meets the speed line RT (at a point P4) at a speed $\Omega$ which is above the maximum speed $\Omega 2$.

According to the invention, particularly in order to overcome these drawbacks, the transmission system 1 additionally comprises at least one active and controllable magnetic damper 5:

- capable of generating a magnetic force capable of acting on said transmission tube 4; and
- controlled in such a way as to generate a magnetic force making it possible to reduce the vibration of said transmission tube 4, at least when the speed of said transmission tube 4 is within predetermined ranges of frequencies defined about said natural frequencies F1 to F3. Each range of frequencies corresponds, for example, to a frequency domain extending ±5 Hz around the natural frequency, for example between (F1−5)Hz and (F1+5)Hz in the case of the natural frequency F1.

Thus, by virtue of the invention, as the speed increases (or decreases), when the rotational speed RT of the transmission tube 4 nears one of said natural frequencies F1 to F3, that is to say when it lies inside one of said aforementioned ranges of frequencies, the magnetic damper 5 according to the invention damps the vibration. In consequence, the usual amplification of the vibration when crossing through the corresponding natural frequency F1–F2–F3 cannot take place, and this makes it possible to prevent the onset of the aforementioned problems.

It will be noted that the damper 5 according to the invention additionally makes it possible to replace one or more of the conventional bearings of the transmission tube 4.

Figure 3:
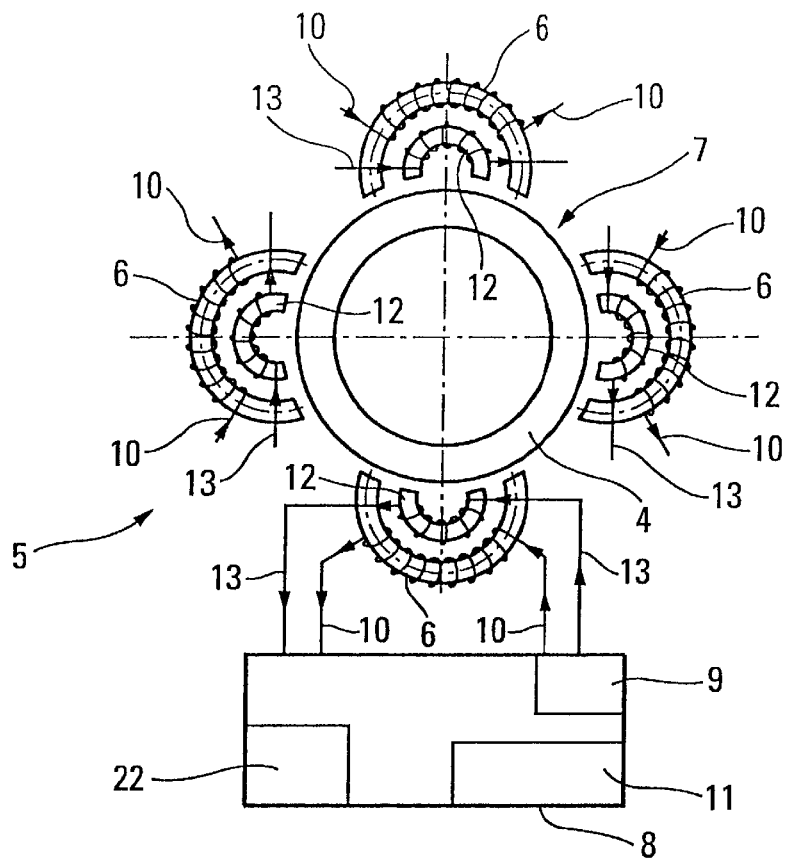
FIG. 3 schematically shows a magnetic damper according to the invention.

In one particular embodiment depicted schematically in FIG. 3, the magnetic damper 5 comprises:

electromagnets 6 mounted in opposed pairs across the transmission tube 4, distributed uniformly about the latter. These electromagnets 6 form a stator which collaborates with a rotor 7 mounted on the transmission tube 4;

said rotor 7, not explicitly depicted, which lies in the electromagnetic field formed by the magnetic forces likely to be generated by the electromagnets 6; and a central unit 8 which comprises an electric current generator 9 of conventional type capable of causing electric current to flow through the electric conductors 10 of said electromagnets 6 as illustrated schematically in the case of just one electromagnet 6 in FIG. 3. The central unit 8 additionally comprises control means 11 specified hereinbelow for controlling the electric current flowing through said electromagnets 6 so as to control the overall magnetic force generated thereby, which force acts on the rotor 7 and therefore on the transmission tube 4.

It will be noted that, by way of illustration, FIG. 3 is partially taken from a work entitled "Techniques de l'Ingénieur [Engineering techniques]" and from an article entitled "Paliers magnétiques [Magnetic bearings]" by Helmut Habermann.

By virtue of the use of this magnetic damper 5, the following advantages are obtained:

reduced play between the transmission tube 4 and the magnetic damper 5, which may be as low as 3 to 4 mm, which reduces the risk of contact between said rotating tube 4 and the stationary parts;

very low power consumption (approximately ten times less than for an equivalent ball bearing), a reduction in losses and an improvement in efficiency;

the absence of mechanical contact between the elements (hence an absence of wear), a longer life and greater reliability;

the possibility of obtaining very high transmission tube 4 rotational speeds;

the possibility of operating under very arduous conditions, particularly at temperatures from −160° C. to +250° C. and in a very aggressive environment;

a regulating system (control loop 14) which is simple, as specified below;

the elimination of the oil and of the lubricating system;

the absence of contamination due to oil or grease; and the possibility of dispensing with the conventional covers intended for transmission system maintenance.

The damper 5 therefore corresponds to a radial magnetic bearing, of conventional type, which in addition is active and performs a damping function.

Said damper 5 further comprises electromagnetic sensors 12 associated with said electromagnets 6 and capable of measuring lateral displacements of the transmission tube 4.

An electromagnetic sensor 12 such as this determines, in the customary way, its distance from the tube 4, as a function of the electric current flowing through the electric conductor 13 surrounding this sensor 12. For this purpose, the electric current flowing through the electric conductor 13 is measured and the measurement is transmitted to the central unit 8 which therefrom deduces said distance by comparing this measurement in the customary way with a reference measurement.

The control means 11 of the central unit 8 comprise, in addition, a control loop 14 which automatically controls the variation in the strength of the electric current flowing through the electromagnets 6 and therefore the magnetic force exerted on the transmission tube 4 as a function of the measurements made by the sensors 12.

Figure 4:
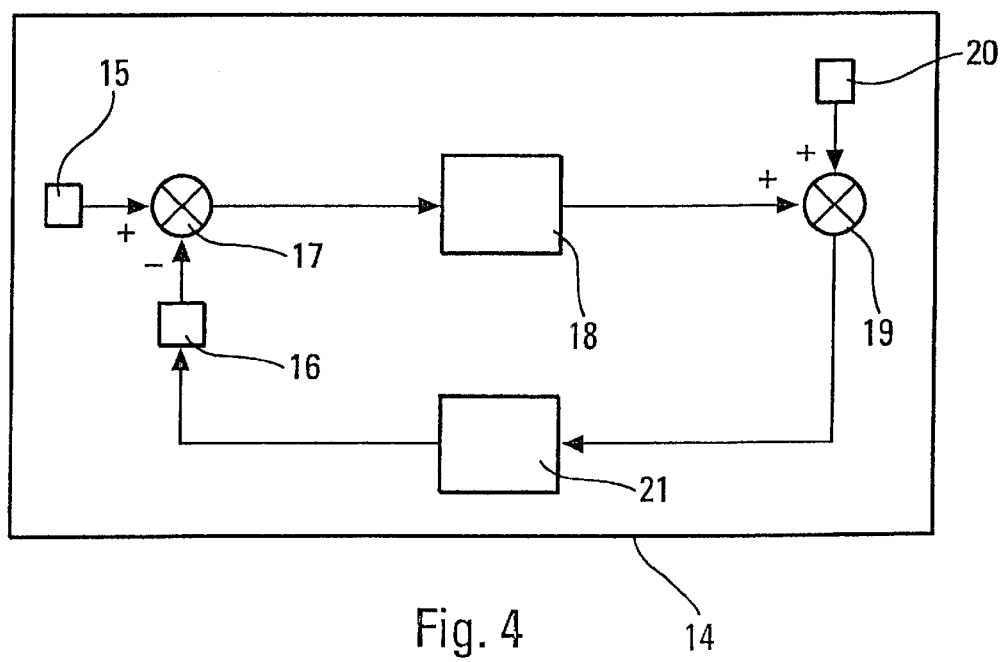
FIG. 4 schematically illustrates a control loop of a magnetic damper according to the invention.

As depicted in FIG. 4, the control loop 14 comprises:

a means 15 comprising, in particular, the sensors 12, for determining the actual lateral position of the tube 4;

a means 16 containing a theoretical position of the tube 4;

a means 17 for calculating the difference between said theoretical and actual positions;

a correction unit 18 determining the correction to be applied by the magnetic damper 5 according to the invention in the form of a corrective (magnetic) force that needs to be exerted on the tube 4;

a means 19 summing this corrective magnetic force and a disturbing external force determined by a means 20; and a calculation unit 21 which determines the theoretical position of the tube 4 from modeling of the transmission system 1, taking into account its transfer function and its matrices of state, and which transmits this theoretical position to the means 16.

The correction unit 18 takes into consideration a transfer function H(p) of the PID (proportional, integral, derivative) type of the damper 5 which is written:

$$H(p)=K0/p+K1+K2.p$$

in which:

K0 is a damping integral term;

K1 is a proportional term; and

K2 is a derivative term.

The purpose of the invention is to control these terms K0, K1 and K2 according to the functions that are to be implemented.

Of course, as mentioned previously, it is possible first of all to carry out a damping function by introducing damping so as to reduce the level of vibration when passing through the critical frequencies F1 to F3.

It is also possible to perform a function of shifting said natural frequencies F1 to F3 by introducing a stiffness.

In general, the shifting of natural frequencies is not sought-after because such shifting may result in instabilities, particularly in a helicopter transmission system 1.

Hence, the damper 5 is formed in such as a way as to shift the natural frequencies, only within a restricted interval, preferably roughly 3% of the initial values of said natural frequencies.

The central unit 8 additionally comprises diagnostic means 22 which can, from the measurements taken by the sensors 12 and from comparing these measurements with reference values, deduce malfunctioning of the transmission system 1. In consequence, said sensors 12 have a dual purpose. Of course, it is also conceivable to provide at least one special-purpose sensor to carry out the measurements intended for said diagnostic means 22.

Furthermore, it will be noted that the position of the magnetic damper 5 along the transmission tube 4 is of decisive importance to the effectiveness of said damper 5. To be effective, it should not be positioned on a vibration node (because it would then be ineffective for the corresponding mode) and it is therefore necessary to choose a position in which it can act on all the modes.

As a preference, said magnetic damper 5 is arranged between said main 2 and rear 3 gearboxes, at a distance d from said main gearbox 2 which is roughly, although not exclusively equal to one tenth of the overall length L of said transmission tube 4, although these dimensions are not shown fully to scale in FIG. 1, in order to make the drawing more clear.

This position may be optimized empirically, using tests and simulations.

What is claimed is:

1. A transmission system for a helicopter equipped with a main gearbox and with a rear gearbox, said transmission system comprising:

a single rotary transmission tube, for connecting said main and rear gearboxes of said helicopter, which is of a supercritical type such that at least one natural frequency of said transmission tube is below its nominal rotational speed; and an active and controllable magnetic damper that is operable to generate a magnetic force for acting on said transmission tube and controllable to reduce the vibration of said transmission tube when a speed of said transmission tube is within a predetermined range of frequencies defined about said natural frequency, wherein said magnetic damper comprises:

a stator which comprises at least one electromagnet for generating said magnetic force;

a rotor which is mounted on said transmission tube and which is situated in a zone of action of said magnetic force;

an electric currant generator for producing an electric current flowing through said electromagnet; and control means for controlling said electric current flowing through said electromagnet so as to control said magnetic force which acts on the rotor and therefore on the transmission tube, and wherein the control means comprise a control loop which automatically controls a variation in strength of said electric current flowing through the electromagnet and which includes:

means for determining an actual lateral position of the transmission tube;

means for containing a theoretical position of the transmission tube;

means for calculating a difference between said theoretical and actual positions;

a correction unit that determines a correction to be applied by the electromagnet in the form of a corrective magnetic force that needs to be exerted on the transmission tubes;

means for summing the corrective magnetic force and a disturbing external force; and a calculation unit which is linked to said means for summing and which determines the theoretical position of the tube from modeling of the transmission system, taking into account a transfer function and matrices of state of the transmission system, and which transmits the theoretical position to said means for containing a theoretical position.

2. The transmission system as claimed in claim 1, wherein said magnetic damper comprises a number of electromagnets mounted in opposed pairs across said transmission tube.

3. The transmission system as claimed in claim 1, wherein said magnetic damper comprises:

at least one sensor that measure a lateral displacement of the transmission tube; and a control loop which controls generation of the magnetic force acting on the transmission tubs as a function of measurements taken by said sensor.

4. The transmission system as claimed in claim 1, wherein said magnetic damper is formed in such a way as to generate a magnetic force that makes it possible to shift at least said natural frequency of the transmission tube.

5. The transmission system as claimed in claim 4, wherein said magnetic damper is formed in such a way as to generate a magnetic force that shifts the natural frequency by roughly 3% of the initial value of amid natural frequency.

6. The transmission system as claimed in claim 1, further comprising:

at least one sensor that measures a lateral displacement of the transmission tube; and diagnostic means for obtaining, from measurements taken by said sensor, any malfunctioning there might be of the transmission system.

7. The transmission system as claimed in claim 1, wherein said magnetic damper is arranged between said main and rear gearboxes at a distance from said main gearbox which is roughly equal to one tenth of the total length of said transmission tube.

8. The transmission system as claimed in claim 1, wherein said range of frequencies corresponds to a frequency domain extending ±5 Hz about said natural frequency.

9. The transmission system as claimed in claim 1, further comprising:

a sensor that measures a lateral displacement of the transmission tube;

diagnostic means for obtaining, from measurements taken by said sensor, any malfunctioning there might be of the transmission system; and a control loop which controls generation of said magnetic force acting on the transmission tube as a function of said measurements taken by said sensor.

* * * * *